United States Patent [19]
Firgo et al.

[11] Patent Number: 5,795,522
[45] Date of Patent: Aug. 18, 1998

[54] CELLULOSE FIBRE

[75] Inventors: Heinrich Firgo, Vöcklabruck; Sigrid Seidl, Seewalchen; Peter Bartsch, Schörfling; Berndt Köll, Lenzing; Eduard Mülleder, Linz, all of Austria

[73] Assignee: Lenzing Atkiengesellschaft, Lenzing, Austria

[21] Appl. No.: 817,012

[22] PCT Filed: Jul. 30, 1996

[86] PCT No.: PCT/AT96/00137

§ 371 Date: Mar. 26, 1997

§ 102(e) Date: Mar. 26, 1997

[87] PCT Pub. No.: WO97/07266

PCT Pub. Date: Feb. 27, 1997

[30] Foreign Application Priority Data

Aug. 11, 1995 [AT] Austria ................................. 1367/95

[51] Int. Cl.⁶ ........................................................ D01F 2/02
[52] U.S. Cl. ................. 264/187; 106/200.1; 106/200.2; 106/200.3; 106/202.1; 264/211.13; 264/211.14
[58] Field of Search ........................... 264/187, 203, 264/211.13, 211.14; 106/200.1, 200.2, 200.3, 202.1

[56] References Cited

U.S. PATENT DOCUMENTS 4,246,221 1/1981 McCorsley, III ........................ 264/203

FOREIGN PATENT DOCUMENTS

| | | |
|---|---|---|
| 538977 | 4/1993 | European Pat. Off. |
| 691426 | 1/1996 | European Pat. Off. |
| 692558 | 1/1996 | European Pat. Off. |
| 692559 | 1/1996 | European Pat. Off. |
| 703305 | 3/1996 | European Pat. Off. |
| WO92/07124 | 4/1992 | WIPO |
| WO94/09191 | 4/1994 | WIPO |
| WO94/20656 | 9/1994 | WIPO |
| WO94/24343 | 10/1994 | WIPO |
| WO95/28516 | 1/1995 | WIPO |
| WO95/30043 | 11/1995 | WIPO |
| WO95/00697 | 1/1997 | WIPO |

OTHER PUBLICATIONS

Abstract of WO 92/14,871 (Published Sep. 3, 1992).
Abstract of WO 95/2,082 (Published Jan. 19, 1995).
Abstract 80791j, Chemical Abstracts vol. 66, pp. 7572 (1967) (discussing–Italian patent application 690,926 (Jun. 24, 1965).).
"Chemical Aftertreatment of Textiles" pp. 414 (H. Mark, N.S. Woodug, S.M. Atlas editors), (Wiley Interscience New York).
Lewis "New possibilities to improve cellulosic fibre dyeing processes with fibre–reactive systems" JSDC vol. 109 (Nov. 1993).
Lewis et al., "New methods for improving the dyability of cellulose fibres with reacive dyes" JSDC vol. 107 (Mar. 1991).

*Primary Examiner*—Leo B. Tentoni
*Attorney, Agent, or Firm*—Baker & Botts LLP

[57] ABSTRACT

This invention relates to a process for the production of a cellulose molded body according to the amine-oxide process, which results in a molded body having reduced and effectively controllable fibrillation properties.

28 Claims, No Drawings

CELLULOSE FIBRE

INTRODUCTION

The present invention is concerned with a new cellulose moulded body and a process for the production of this cellulose moulded body. Particularly, the present invention is concerned with a new cellulose fibre and a new cellulose film having a predetermined tendency to fibrillation.

BACKGROUND OF THE INVENTION

As an alternative to the viscose process, in recent years there have been described a number of processes wherein cellulose, without forming a derivative, is dissolved in an organic solvent, a combination of an organic solvent and an inorganic salt, or in aqueous saline solutions. Cellulose fibres made from such solutions have received by BISFA (The International Bureau for the Standardisation of man made Fibres) the generic name Lyocell. As Lyocell, BISFA defines a cellulose fibre obtained by a spinning process from an organic solvent. By "organic solvent", BISFA understands a mixture of an organic chemical and water.

So far, however, only one process for the production of a cellulose fibre of the Lyocell type has achieved industrial-scale realization. In this process, in the following referred to as amine-oxide process, a tertiary amine-oxide, particularly N-methylmorpholine-N-oxide (NMMO), is used as a solvent. Such a process is described for instance in U.S. Pat. No. 4,246,221 and provides fibres which exhibit a high tensile strength, a high wet-modulus and a high loop strength.

A typical feature of the Lyocell fibres is their pronounced tendency to fibrillate when wet. Fibrillation means the breaking up of the fibre in longitudinal direction at mechanical stress in a wet condition, so that the fibre gets hairy, furry. The reason for fibrillation may be that the fibres consist of fibrils which are arranged in the longitudinal direction of the fibre axis and that there is only little crosslinking between these.

WO 92/14871 describes a process for the production of a fibre having a reduced tendency to fibrillation. The reduced tendency to fibrillation is attained by providing all the baths with which the fibre is contacted before the first drying with a maximum pH value of 5.5.

WO 92/07124 also describes a process for the production of a fibre having a reduced tendency to fibrillation wherein the never dried fibre is treated with a cationic polymer. As such a polymer, a polymer having imidazole and azetidine groups is mentioned. Additionally, there may be carried out a treatment with an emulsifiable polymer, such as polyethylene or polyvinylacetate, or a crosslinking with glyoxal.

In a lecture given by S. Mortimer at the CELLUCON conference in 1993 in Lund, Sweden, it was mentioned that the tendency to fibrillation rises as drawing is increased.

There have been published already some methods to reduce the tendency to fibrillation of Lyocell fibres:

Thus from WO 95/02082 of the applicant it is known that fibrillation may be reduced by certain combinations of spinning parameters.

Moreover, it is known that the fibrillation properties of Lyocell fibres may be improved by chemical crosslinking. Thus, e.g. EP-A - 0 538 977 describes crosslinking of Lyocell fibres with chemical reagents able to react with cellulose in a state before any drying, i.e. when the fibre is produced, as well as in a dried state, i.e. substantially during finishing of the textile fabrics.

Crosslinking Lyocell fibres during finishing has the main drawback for the finishing operator of requiring additional steps which cause additional costs. Also, the application of such additional steps limits the variety of produceable textile fabrics, which again restricts the marketing possibilities of the Lyocell fibres. Another essential disadvantage of the treatment of Lyocell fibres after a first drying consists in that the susceptibility of the fibres for crosslinking chemicals is significantly reduced, particularly after the first drying, as compared to the state they exhibit when they are freshly spun. This requires the use of greater amounts of chemicals.

The crosslinking reagents exemplified in the above patent application exhibit as groups capable of crosslinking halogen-substituted, nitrogen-containing ring structures able to react with the hydroxyl groups of the cellulose in alkaline conditions. Moreover, compounds comprising vinyl sulphone groups or their precursors are described. These compounds substantially also react only when alkali is added, or they require alkali as a neutralisation reagent for split off acids. The procedures proposed in this patent application for crosslinking never dried Lyocell fibres have serious drawbacks insofar as it is difficult and requires a complex arrangement to carry them out in a continuous fibre post-treatment process. When very reactive compounds of the suggested compound classes are used, a separate application of the crosslinking substances from the basic compounds necessary to initiate the reaction with the cellulose is required. When less reactive compounds are used, frequently a simultaneous application of the crosslinking agents and the alkali is possible, but in this case a temperature step has to be carried out which in the indicated patent application is attained by "steaming". Thus, a serious drawback of the indicated patent is an increase of the number of post-treatment steps, which implies a significant cost raise, especially when constructing a plant for the production of such a fibre.

However, there is still another drawback to this procedure. When halogenated, nitrogen-containing rings or the vinyl sulphones and their precursor substances respectively are reacted, salts are formed during the crosslinking reaction which have to be washed out of the fibre afterwards. Moreover, also excess residual chemicals not reacted with the cellulose have to be washed out. This means that in a continuous fibre production process, another post-treatment step is necessary, causing further investment and operating costs and creating additional problems with contaminated waste water.

In WO 94/24343 of the applicant, similar processes for crosslinking Lyocell fibres to reduce fibrillation are proposed, describing the use of alkali buffers and an exposure to electromagnetical waves as particularly advantageous.

WO 94/20656 describes a reduction of the fibrillation of Lyocell fibres by means of crosslinking using conventional crosslinking chemicals usually employed to improve crease angles of cellulose textiles while a simultaneous reduction of the dye absorption is prevented when the crosslinking is carried out in the simultaneous presence of flexible, linear polymers. Substantially, conventional N-methylol resins (containing a low formaldehyde level) and the usual acidic catalysts are used. This method is described as efficient for use on the dried as well as on the never dried fibre.

But also this procedure has drawbacks which make another crosslinking method desirable. The methylol resins usually employed for improving the wet crease angles need relatively high reaction temperatures, generally from 120°

C. to 160° C., to react with the OH groups of the cellulose, when the reaction is to be carried out at a sufficient rate. In the international patent application indicated, also very high temperatures for fixing the crosslinking agents are applied. This implies always a more or less significant loss of fibre strength, but above all a loss of fibre elongation and loop strength, and the fibre is getting brittle. Moreover, in the cited patent application no comparative physical fibre parameters before and after the crosslinking reaction are indicated. Reactions with the cited N-methylol compounds at low temperatures and thus a higher fibre moisture, which do not imply such serious strength and elongation losses, usually require very long reaction times and therefore are hardly suitable for continues fibre production processes.

Moreover it is known that cellulose fibre textiles may be dyed with conventional reactive dyes at neutral pH values without adding salt when they are appropriately pre-treated (Lewis et al., JSDC volume 107, March 1991, and JSDC volume 109, November 1993). The nitrogen hetero rings containing vinyl sulphone or halogens which under alkaline conditions usually react as anchoring groups with the hydroxy groups of the cellulose will react with the amino groups without addition of alkali, since they represent significantly stronger nucleophiles than the hydroxy groups.

In "Chemical Aftertreatment of Textiles" (H. Mark, N. S. Wooding, S. M. Atlas), page 414, a wet crosslinking of quaternized diethylaminocellulose in hydroxy form at room temperature is described.

In the Italian patent application 690,926 (1965), the inner salt of trissulfatoethylsulphonium for the alkaline crosslinking of gelatine is described. The reaction is carried out at pH 7 and at a temperature of 50° C.

BRIEF SUMMARY OF THE INVENTION

It is the objective of the invention to produce a Lyocell moulded body having reduced and effectively controllable fibrillation properties by means of crosslinking reactions, while the production process does not have the disadvantages described of the known crosslinking processes. It is another objective of the invention to provide fibres having improved wet crease angles in a textile fabric, thus allowing the production of Lyocell textiles without any of the high-grade finishing chemicals usually employed in textile finishing.

According to the invention, this objective is attained by means of a process according to the amine-oxide process for the production of a cellulose moulded body, wherein a suspension of cellulose in an aqueous tertiary amine-oxide is transformed into a spinnable solution, extruded through a spinneret, and the moulded body obtained is conducted through a precipitation bath, which process is characterized in that (a) a suspension containing a substance able to react with the cellulose and to incorporate functional groups which are more nucleophilic than the hydroxy groups of the cellulose is employed; and/or (b) a cellulose carrying functional groups which are more nucleophilic than the hydroxy groups of the cellulose is employed, and/or (c) a suspension containing a polymer carrying functional groups which are more nucleophilic than the hydroxy groups of the cellulose is employed, and/or (d) a substance capable of reacting with the cellulose and incorporating functional groups which are more nucleophilic than the hydroxy groups of the cellulose is added to the spinnable solution; and/or (e) a polymer carrying functional groups which are more nucleophilic than the hydroxy groups of the cellulose is added to the spinnable solution.

According to the invention, the object is also attained by means of a process for the production of a cellulose moulded body according to the amine-oxide process, wherein a suspension of cellulose in an aqueous tertiary amine-oxide is transformed into a spinnable solution, extruded through a spinneret and the moulded body obtained is conducted through a precipitation bath, which process is characterized in that (a) functional groups which are more nucleophilic than the hydroxy groups of the cellulose are incorporated into the moulded body obtained, or (b) the moulded body obtained is contacted with an oligomer or a polymer carrying functional groups which are more nucleophilic than the hydroxy groups of the cellulose, whereafter the moulded body is treated with a crosslinking agent which reacts with the nucleophilic groups, provided that it substantially does not react with the hydroxy groups of the cellulose.

DETAILED DESCRIPTION OF THE INVENTION

For the purposes of the present specification and claims, the term "moulded body" denotes particularly fibres and films. In the following, the term "fibres" denotes fibres, films and also other moulded bodies.

To obtain the known good physical fibre parameters such as a high wet strength, a high loop strength and a high wet-modulus, according to the invention the fibre is preferably crosslinked in humid state. Moisture contents of 40% up to a free swelling which occurs when the fibre floats in a long bath are preferred.

In a particularly preferred embodiment, the fibre has a moisture content of between 70% and 150% during the crosslinking reaction. The crosslinking is achieved by incorporating into the fibre groups which are more nucleophilic than the hydroxy groups of the cellulose fibre already before treatment with the crosslinking agent, which groups react with the crosslinking agent without addition of further alkali. The crosslinking agents are generally known chemicals used in the textile finish of cellulose textiles. Substantially, they are molecules carrying the known reactive groups of the reactive dyes, which may be coloured or not coloured.

Obviously, those skilled in the art may employ also others than the crosslinking chemicals here indicated, such as commercially available crosslinking chemicals as well as new ones specifically synthesized for the crosslinking of Lyocell fibres. The compounds may contain at least two reactive groups identical or different from each other whereupon the nucleophilic groups may act, and they also may comprise several such groups. Reactive polymers having a variety of nucleophilic groups are also possible.

The reactive groups are preferably vinyl sulphone groups or their precursor structures or halogenated nitrogen hetero rings, particularly triazine rings having one or two halogen atoms, and also epoxy groups. The nucleophilic groups incorporated into the cellulose fibre before crosslinking are preferably primary or secondary amino groups which react very easily, usually already at room temperature, with the crosslinking reagents indicated, but also other nucleophilic groups known to those skilled in the art such as thiol groups have the same effect. In the crosslinking reactions according to the invention, the reaction does not take place between the crosslinking agent molecules and the hydroxy groups of the cellulose, but between the crosslinking agent molecules and the more nucleophilic groups.

Thus there are several possibilities to incorporate the nucleophilic groups capable of crosslinking according to the invention:

a) State of the art of the amine-oxide process is the production of the cellulose solution producing a two-phase mixture of pulp and aqueous NMMO in a concentration and at a temperature whereat the cellulose will not yet dissolve, and subsequently the removal of the excess water at an elevated temperature in a vacuum and under a strong shearing of the mixture, forcing the dissolution of the cellulose when a concentration substantially corresponding to the NMMO monohydrate is reached. To incorporate the nucleophilic groups it is possible to add cellulose reactive substances to the two-phase cellulose/NMMO mixture which react under alkaline conditions. A preferred embodiment is the addition at this point of primary and secondary epoxy compounds containing amino groups which during the production of the solution react with the cellulose to cellulose containing amino groups. This reaction may be additionally catalyzed by means of small amounts of alkali.

Obviously, those skilled in the art may carry out at this point also other alkaline substitution reactions on the cellulose which lead to nucleophilic reaction centres in the cellulose. Thus, instead of the epoxy compounds, e.g. also the appropriate epichlorohydrines and suitably higher amounts of alkali may be employed. This procedure however implies a higher purification effort when recovering the solvent, due to the formation of salt during the reaction. Moreover, the addition of compounds having an activated double bond containing additionally amino groups is possible. Even the addition of amino group-containing (secondary and primary) cellulose reactive polymers at this point is effective.

b) When producing the solution according to the invention, instead of a derivatisation of the pulp employed also polymers having more nucleophilic groups than the cellulose may be added, which polymers are precipitated simultaneously with the cellulose when precipitating the cellulose solution in the spinning bath and incorporated into the cellulose filaments. Examples for such substances include chitosans, amino-group containing starch derivatives, amino-group containing cellulose derivatives as well as natural proteins such as gelatine and the like.

When selecting these amino-group containing polymers, those skilled in the art will take care that the polymers dissolve well or at least distribute well in the NMMO/cellulose solution and that in the spinning bath they are incorporated to a great extent in the freshly precipitated fibre, since otherwise also in this case increased efforts for recovering the solvent and purifying have to be undertaken. Thus, hardly soluble polymers and/or polymers having a high substantivity to cellulose, such as polymers carrying quaternary groups additionally to the reactive amino groups, are particularly suitable.

c) The amino groups (or other more nucleophilic groups than the hydroxy groups of the cellulose) may be incorporated into the never dried fibre also in the fibre post-treatment after removing the NMMO attached after fibre regeneration. E.g., the fibre may be treated in a never dried state with an acidic solution of chitosans which is rendered insoluble in and on the fibre by a subsequent treatment with water whereto a base has been added. Then the fibres modified with nucleophilic groups thus obtained may be reacted with the crosslinking chemicals according to the invention.

Another way of applying polymers containing nucleophilic groups in fibre post-treatment is concerned with the use of polymers and oligomers having a high substantivity to cellulose. Such polymer molecules carry additionally to the nucleophilic groups cation groups to increase their substantivity. Also the never dried cellulose fibres thus obtained containing reactive, nucleophilic groups may then be reacted according to the invention with the described crosslinking molecules.

By incorporating a precisely defined amount of groups being more nucleophilic than the hydroxy groups of the cellulose, new cellulose fibres having an effectively adjustable crosslinking degree may be produced. The crosslinking degree determines the tendency to fibrillation such that a high crosslinking degree results in a fibre having a reduced tendency to fibrillation and inversely a low crosslinking degree results in a fibre having a high tendency to fibrillation. Thus the present invention is also concerned with crosslinked cellulose fibres exhibiting a predetermined tendency to fibrillation which may be produced from the new, not crosslinked cellulose fibres.

The crosslinking of the cellulose fibres may also be carried out after drying the not crosslinked cellulose fibres.

The invention will now be described in more detail by means of the following examples.

EXAMPLE 1

Polyacrylamide (2% by mass, based on cellulose; produced by Sigma Aldrich) having a molecular mass of 5,000,000–6,000,000 g/mol was dissolved under stirring in a 50% NMMO solution.

The amount of pulp adequate to the NMMO/water/polyacrylamide portions for producing a spinning solution having a cellulose content of 15% by mass was mixed with the NMMO/water/polyacrylamide solution in a kneading device. The spinning solution was produced under heating and volatilization of water at reduced pressure.

The resulting spinning solution was spun in a spinning device (spinning temperature: 115° C.; hole diameter: 100 µm; air gap (distance between nozzle and spinning bath): 3 cm; climate in the air gap: 30 g $H_2O$/kg air) to produce a filament (titer: 1.7 dtex). This filament served as an assay material in crosslinking operations.

The nitrogen content of the fibre material thus obtained was 0.21 g/kg fibre. Of this fibre, the abrasion value was determined (see below). Furthermore, it was treated with a crosslinking solution (see below). The abrasion value of the crosslinked fibre was also determined.

Crosslinking

The fibre was dried and for a period of 10 minutes was impregnated with a glyoxal solution (concentration 5 g/l; pH 7) at room temperature and was squeezed out to a residual moisture content of 120%. Subsequently it was heated for a period of 10 minutes at 100° C., then washed and dried at 60° C.

Determination of the abrasion value

In order to determine the abrasion value, the fibre was laid over a rotatable shaft covered with a wet viscose fabric. Here the fibre was clamped fast at an angle of 50° relative to the axis of rotation of the shaft and was loaded with a pretension weight of 70 mg at the lower end.

The shaft was rotated at a speed of 500 r.p.m., and the time till breaking of the thread was measured. This was the base to calculate the number of revolutions necessary for wearing through, i.e. abrading. The crosslinking strength can thus be inferred from the number of revolutions, the crosslinking naturally being stronger the greater the number of revolutions necessary for wearing through the thread.

To determine the abrasion value, 20 samples of filaments were examined each time and the mean value was determined, which subsequently was divided by the titer of the examined fibre. Hence the dimension of the abrasion value is revolutions/dtex.

Table 1 below lists the results of the following three fibres:

Fibre (1), a pure cellulose fibre (Lyocell fibre), produced without addition of polyacrylamide but crosslinked with glyoxal;

Fibre (2), a cellulose/polyacrylamide fibre, not crosslinked with glyoxal;

Fibre (3), a cellulose/polyacrylamide fibre, crosslinked with glyoxal.

TABLE 1

| Fibre | Abrasion value |
| --- | --- |
| (1) cellulose fibre (without polyacrylamide; crosslinked) | 59 |
| (2) cellulose/polyacrylamide fibre (not crosslinked) | 49 |
| (3) cellulose/polyacrylamide fibre (crosslinked) | 198 |

From Table 1 it can be seen that fibre (3) exhibits the highest abrasion value and that the addition of polyacrylamide provided in accordance with the invention increases the abrasion value from 59 to almost 200.

EXAMPLE 2

The procedure here was analogous to that used in Example 1, with the proviso that the spinning solution was produced without polyacrylamide and that, prior to spinning, 1.5% polyethylene imine ("Lugalvan" G35, manufacturer: BASF; MW: 2000) was introduced into the spinning solution.

Crosslinking was also carried out analogous to Example 1, but by means of trifunctional epoxide (1% solution of 1,3,5-triglycidyl isocyanurate; trademark: Araldit; manufacturer: Ciba Geigy).

The results of the abrasion test (cf. Example 1) are given in Table 2 below.

TABLE 2

| Fibre | Abrasion value |
| --- | --- |
| (4) cellulose/polyethylene imine fibre (not crosslinked) | 13.4 |
| (5) cellulose/polyethylene imine fibre (crosslinked) | 41.0 |

EXAMPLE 3

A 50% aqueous solution of polyethylene imine was added to a spinning solution having a cellulose content of 12% by mass, and said spinning solution was then spun according to Example 1 to obtain fibres. The resulting fibre exhibited a nitrogen content of 1.05% and for a period of 2 minutes was impregnated with a solution containing 2,4-dichlor-6-aminobenzene-4'-sulfatoethylsulphone-s-triazine (10 g/l) and soda (20 g/l), was squeezed out to a residual moisture content of 130% and heated in the drying chamber for a period of 10 minutes at 120° C.

This fibre modified with polyethylene imine exhibited an enhanced reactivity to the crosslinking agent used here and also to other, similar crosslinking agents.

The abrasion values were determined as described in Example 1 and are listed in Table 3 below.

TABLE 3

| Fibre | Abrasion value |
| --- | --- |
| (6) cellulose/polyethylene imine fibre (not crosslinked) | 24.1 |
| (7) cellulose/polyethylene imine fibre (crosslinked) | 100 |

EXAMPLE 4

A cellulose fibre (Lyocell fibre) was impregnated with a 0.5% acetic chitosan solution (pH 5) for a period of 10 minutes at 40° C. and was squeezed out to a residual moisture content of 130%, was subsequently heated in the drying chamber for a period of 5 minutes at 100° C. and finally rinsed.

The fibre thus modified with chitosan was impregnated with a solution containing 2,4-dichloro-6-aminobenzene-4'-sulfatoethylsulphone-s-triazine (10 g/l) and soda (20 g/l) for a period of 2 minutes, was squeezed out to a residual moisture content of 130% and heated in the drying chamber for a period of 10 minutes at 120° C.

This fibre modified with chitosan exhibited an enhanced reactivity to the crosslinking agent used here and also to other, similar crosslinking agents.

The abrasion values were determined as described in Example 1 and are listed in Table 4 below.

TABLE 4

| Fibre | Abrasion value |
| --- | --- |
| (8) cellulose fibre (crosslinked) | 366 |
| (9) cellulose/chitosan fibre (crosslinked) | 1276 |

EXAMPLE 5

A dried cellulose fibre (Lyocell fibre) was impregnated with a solution containing N-hydroxymethylacrylamide (110 g/l) and zinc chloride (10 g/l) for one minute at room temperature, was subsequently squeezed out to a residual moisture content of 130%, then pre-dried for one hour at 60° C. and set at 150° C. The nitrogen content of the fibre was 0.38% by mass.

The fibre modified with N-hydroxymethylacrylamide was boiled with a 25% ammonia solution for one hour, whereby a fibre with additional functional groups was obtained (0.96% N). This fibre was crosslinked with a solution containing 2,4-dichloro-6-aminobenzene-4'-sulfatoethylsulphone-s-triazine (10 g/l) but no alkali in accordance with Example 3.

This fibre modified with N-hydroxymethylacrylamide exhibited an enhanced reactivity to the crosslinking agent used here and also to other, similar crosslinking agents.

The abrasion values were determined as described in Example 1 and are listed in Table 5 below.

TABLE 5

| Fibre | Abrasion value |
| --- | --- |
| (10) cellulose fibre (crosslinked without alkali) | 50 |
| (11) cellulose fibre containing amino groups (not crosslinked) | 6952 |
| (12) cellulose fibre containing amino groups (crosslinked) | 10306 |

EXAMPLE 6

In a kneading machine (HKD-T by IKA-Labortechnik) a spinning solution was produced from 20 g pulp, 308 g aqueous NMMO (50%) and 1 g gelatin under volatilization of the excess amount of water.

A melt index device by Davenport, which is common in plastics processing, was used as the spinning device. The device in question consists of a heated, temperature-controlled cylinder into which the spinning solution was filled. By means of a piston the spinning solution was extruded through the spinneret (hole diameter: 100 µm) arranged on the lower surface of the cylinder(spinning solution: 100° C.; output: 0.025 g/hole/min). The selected air gap was 40 mm. The fibre obtained was washed with water and was crosslinked directly afterwards, that is, in the never dried state.

For crosslinking, 1 g fibre in the form of a strand was impregnated at room temperature in 100 ml of an aqueous solution of the inner salt of disodium-tris($\beta$-sulfatoethyl) sulphonium (2.7 g/l; pH 8) for a period of 5 minutes and was subsequently squeezed out to a residual moisture content of 140%. After this the fibre was dried overnight at 60° C.

The resulting fibre was examined for its tendency to fibrillate by means of the shaking test described below:

8 fibres having a length of 20 mm were placed in a 20 ml sample bottle together with 4 ml water and for a period of 9 hours were shaken on a laboratory shaking device, type RO-10 by Gerhardt of Bonn, (DE), at speed 12. Subsequently, fibrillation of the fibres was judged under the microscope by counting the fibrils formed on 0.276 mm of fibre length. With this test, a Lyocell type cellulose fibre formed 50 fibrils. A modal type cellulose fibre known as having a low fibrillation rate, with this test exhibited 1 to 2 fibrils.

Table 6 below gives the result of the shaking test of the fibre in accordance with Example 6 (fibre 14) as well as of a cellulose fibre that has not been crosslinked, for comparison.

EXAMPLE 7

The procedure here was analogous to that used in Example 6, except that instead of gelatin, 0.6 g polyvinyl amine were added to the spinning solution. For producing the polyvinyl amine, polyvinyl amine hydrochloride (manufacturer: Hoechst) was neutralized and freeze dried.

Spinning and crosslinking as well as the test for fibrillation were carried out analogous to Example 6. The result can be seen from table 6 below.

TABLE 6

| Fibre | Number of fibrils |
| --- | --- |
| (13) cellulose fibre (not crosslinked) | >50 |
| (14) cellulose fibre modified with gelatin (crosslinked) | 30 |
| (15) cellulose fibre modified with polyvinyl amine (crosslinked) | 40 |

We claim:

1. A process for the production of a cellulose molded body according to an amine-oxide process comprising the steps of
   (a) providing a suspension of cellulose in an aqueous tertiary amine-oxide, the suspension including a substance which reacts with the cellulose and incorporates functional groups therein which are more nucleophilic than hydroxyl groups in the cellulose;
   (b) transforming the suspension of cellulose into a spinnable solution;
   (c) extruding said solution through a spinneret thereby forming a molded body; and
   (d) conveying the molded body to a precipitation bath.

2. A process for the production of a cellulose molded body according to an amine-oxide process comprising the steps of
   (a) providing a suspension of cellulose in an aqueous tertiary amine-oxide wherein the cellulose comprises functional groups which are more nucleophilic than hydroxy groups of said cellulose;
   (b) transforming the suspension of cellulose into a spinnable solution;
   (c) extruding said solution through a spinneret thereby forming a molded body; and
   (d) conveying the molded body to a precipitation bath.

3. A process for the production of a cellulose molded body according to an amine-oxide process comprising the steps of
   (a) providing a suspension of cellulose in an aqueous tertiary amine-oxide, the suspension including a polymer having functional groups which are more nucleophilic than hydroxyl groups of said cellulose;
   (b) transforming the suspension of cellulose into a spinnable solution;
   (c) extruding said solution through a spinneret thereby forming a molded body;
   (d) conveying the molded body to a precipitation bath.

4. A process for the production of a cellulose molded body according to an amine-oxide process comprising the steps of
   (a) providing a suspension of cellulose in an aqueous tertiary amine-oxide;
   (b) transforming the suspension of cellulose in an aqueous tertiary amine-oxide into a spinnable solution;
   (c) adding a substance to the spinnable solution which reacts with the cellulose and incorporates functional groups therein which are more nucleophilic than hydroxy groups of the cellulose;
   (d) extruding said solution through a spinneret thereby forming a molded body; and
   (e) conveying the molded body to a precipitation bath.

5. A process for the production of a cellulose molded body according to an amine-oxide process comprising the steps of
   (a) producing a suspension of cellulose in an aqueous tertiary amine-oxide;
   (b) transforming the suspension of cellulose into a spinnable solution;

(c) adding a polymer to the spinnable solution, the polymer having functional groups which are more nucleophilic than hydroxy groups of the cellulose;

(d) extruding said solution through a spinneret thereby forming a molded body; and (e) conveying the molded body to a precipitation bath.

6. A process for the production of a cellulose molded body according to an amine-oxide process, comprising the steps of (a) providing a suspension of cellulose in an aqueous tertiary amine-oxide;

(b) transforming a suspension of cellulose in an aqueous tertiary amine-oxide into a spinnable solution;

(c) extruding said solution through a spinneret thereby forming a molded body;

(d) incorporating functional groups which are more nucleophilic than hydroxy groups of the cellulose into the molded body; and (e) conveying the molded body to precipitation bath.

7. A process for the production of a cellulose molded body according to an amine-oxide process comprising the steps of (a) providing a suspension of cellulose in an aqueous teary amine-oxide;

(b) transforming a suspension of cellulose in an aqueous tertiary amine-oxide into a spinnable solution;

(c) extruding said solution through a spinneret thereby forming a molded body;

(d) contacting the molded body with an oligomer or a polymer having functional groups which are more nucleophilic than hydroxy groups of the cellulose; and (e) conveying the molded body to a precipitation bath.

8. A process according to any one of claims 1, 2, or 4 further comprising the step of contacting a crosslinking agent with the functional groups which are more nucleophilic than hydroxy groups of the cellulose after the functional groups have been incorporated into the cellulose.

9. A process according to claim 6 further comprising the step of contacting a crosslinking agent with the functional groups after the functional groups have been incorporated into the molded body.

10. A process according to claim 7 further comprising the step of contacting the molded body with a crosslinking agent after contacting the molded body with an oligomer or polymer, wherein the crosslinking agent reacts with the functional groups.

11. A process according to claim 8 wherein the crosslinking agent does not substantially react with hydroxy groups of the cellulose.

12. A process according to claim 9 wherein the crosslinking agent does not substantially react with hydroxy groups of the cellulose.

13. A process according to claim 9 wherein the crosslinking agent does not substantially react with the hydroxy groups of the cellulose.

14. A process according to any of one of claim 1, 2, 3, 4, 5, 6, or 7 wherein the functional groups include functional groups selected from the group consisting of primary amino groups, secondary amino groups, or thiol groups.

15. A process according to claim 8 wherein the crosslinking agent comprises at least two halogen-containing nitrogen hetero rings.

16. A process according to claim 9 wherein the crosslinking agent comprises at least two halogen-containing nitrogen hetero rings.

17. A process according to claim 10 wherein the crosslinking agent comprises at least two halogen-containing nitrogen hetero rings.

18. A process according to claim 8 wherein the crosslinking agent comprises at least two epoxy groups.

19. A process according to claim 9 wherein the crosslinking agent comprises at least two epoxy groups.

20. A process according to claim 10 wherein the crosslinking agent comprises at least two epoxy groups.

21. A process according to claim 8 wherein the crosslinking agent comprises at least two groups selected from the group consisting of vinyl sulphone groups, halogen-containing nitrogen hetero rings, and epoxy groups.

22. A process according to claim 9 wherein the crosslinking agent comprises at least two groups selected from the group consisting of vinyl sulphone groups, halogen-containing nitrogen hetero rings, and epoxy groups.

23. A process according to claim 10 wherein the crosslinking agent comprises at least two groups selected from the group consisting of vinyl sulphone groups, halogen-containing nitrogen hetero rings, and epoxy groups.

24. A process according to any one of claim 5 or 7, wherein the polymer is selected from the group consisting of chitosans, amino-group containing starch derivatives, amino group containing cellulose derivatives, and gelatin.

25. A cellulose molded body prepared by a process according to any one of claim 1, 2, 3, 4, 5, 6, or 7.

26. A cellulose molded body prepared by the process in any one of claims 1, 2, 3, 4, 5, 6, or 7, wherein the cellulose molded body is dried.

27. A cellulose molded body prepared by a process according to claim 25, wherein the cellulose molded body is in the shape of a fiber.

28. A cellulose molded body according to claim 25, wherein the cellulose molded is in the shape of a film.

* * * * *